United States Patent [19]
Riceman et al.

[11] Patent Number: 5,960,067
[45] Date of Patent: Sep. 28, 1999

[54] APPARATUS AND METHOD FOR PARALLEL TRANSMISSION OF DATA OVER A TELEPHONE LINE

[76] Inventors: William K. Riceman, 300 E. McBee Ave., Greenville, S.C. 29601; Stephen A. Hollock, Rd. 1, Box 529, Otego, N.Y. 13825

[21] Appl. No.: 08/889,776

[22] Filed: Jul. 8, 1997

[51] Int. Cl.⁶ .................................................. H04M 11/00
[52] U.S. Cl. ..................................... 379/93.26; 379/93.28; 379/93.08
[58] Field of Search ............................. 379/93.08, 93.26, 379/93.28, 93.31; 370/295, 477, 478, 431, 480, 482; 375/260

[56] References Cited

U.S. PATENT DOCUMENTS

| 4,635,278 | 1/1987 | Maloon et al. | 370/480 |
| 5,519,731 | 5/1996 | Cioffi | 379/93.08 |

*Primary Examiner*—Curtis A. Kuntz
*Assistant Examiner*—Melur Ramakrishnaiah
*Attorney, Agent, or Firm*—Jean-Marc Zimmerman

[57] ABSTRACT

An apparatus and method for high speed transmission of data over a telephone line, wherein this high speed is achieved by simultaneously transmitting multiple bits of data over parallel frequencies rather than serially transmitting one bit of data at a time over one frequency.

20 Claims, 4 Drawing Sheets

APPARATUS AND METHOD FOR PARALLEL TRANSMISSION OF DATA OVER A TELEPHONE LINE

FIELD OF THE INVENTION

This invention relates to devices for transmitting data over a communications line, and more particularly to an apparatus and a process for transmitting data in parallel over a communications line.

BACKGROUND OF THE INVENTION

Devices for transmitting data over communications lines such as modems are well known in the prior art. These devices are commonly used throughout the world to enable businesses, governments and educational institutions to conduct their affairs. They are also being used more commonly in homes throughout the world for personal computing. The use of these devices continues to increase as ever larger numbers of people are communicating on the information super highway.

Although improvements in modem technology enable the speed at which these devices can operate, the process they employ to transmit data serves as an inherent limitation on the top speed they will ever be able to attain. This is because conventional modems transmit data in serial, i.e. one bit at a time, over one frequency. It is, therefore, an object of this invention to provide an apparatus and a process which overcomes this limitation by simultaneously transmitting multiple bits of data over parallel frequencies.

SUMMARY OF INVENTION

An apparatus and method for high speed transmission of data over a communications line, wherein this high speed is achieved by generating multiple tones to enable multiple bits of data to be simultaneously transmitted over parallel frequencies rather than being transmitted one bit at a time over one frequency.

DETAILED DESCRIPTION OF THE FIGURES

Figure 1:
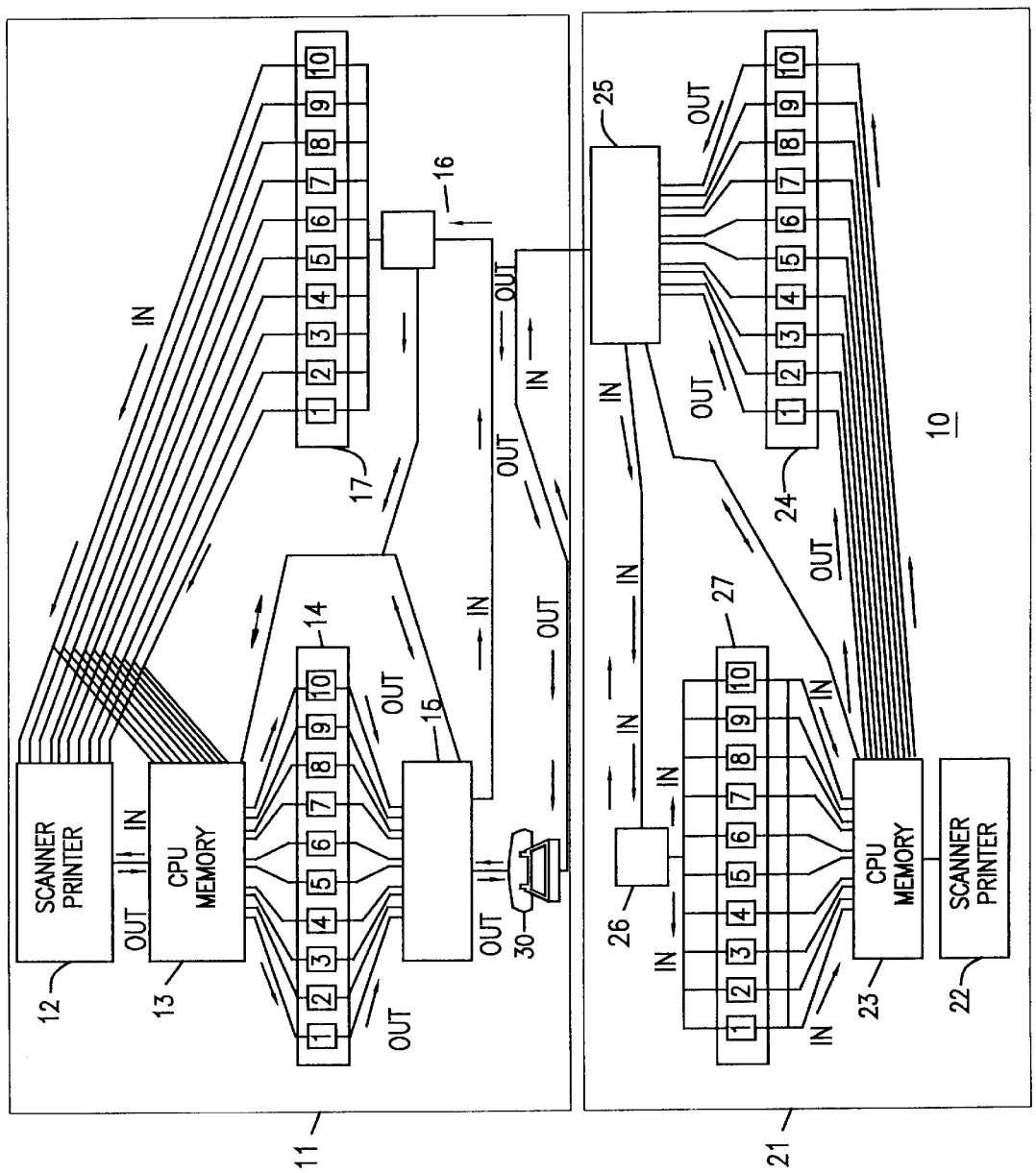
Referring to FIG. 1, there is shown an exemplary embodiment of the apparatus which is the object of this invention.

Referring to FIG. 1, there is shown a system for high speed parallel transmission of data over a communications line according to the present invention 10. This system is comprised of two identical transmitter-receivers 11 and 21. Transmitter-receiver 11 is comprised of scanner/printer 12, CPU and memory 13, outgoing tone generator 14, mixer 15 multi-line connector 16 and incoming tone discriminators/filters 17. Transmitter-receiver 21 is comprised of printer/scanner 22, CPU and memory 23, outgoing tone generators 24, mixer/switcher 25, multi-line connector 26 and incoming tone discriminator/filters 27. Device 11 is coupled to device 21 over a communication line such as a standard copper telephone line 30. The system disclosed herein can be used to transmit data via computer, facsimile machine, video telephones or any similar device.

There is a limit on the amount of data which can be transmitted over conventional communications lines such as copper phone lines using existing technology. The fastest modems are only able to transmit 56.6 thousand bits of data per second. The present invention allows much greater amounts of data to be transmitted by splitting the tone transmitted over a telephone line into multiple tones, and then using pure tones which when combined form a tone which can be filtered, thereby allowing multiple bits of data to be simultaneously transmitted over parallel frequencies.

The present system is designed to transmit data which can be generated or saved in an 8 bit/byte format or any derivative or multiple thereof. Transmission of the data is based on whether a bit is on or off. Detection on the receiving end is based on either the presence or absence of bit specific tones, while all other tones are filtered out and/or ignored. Once converted back to the 8 bit code, the data is saved for viewing or printing.

Figure 2:
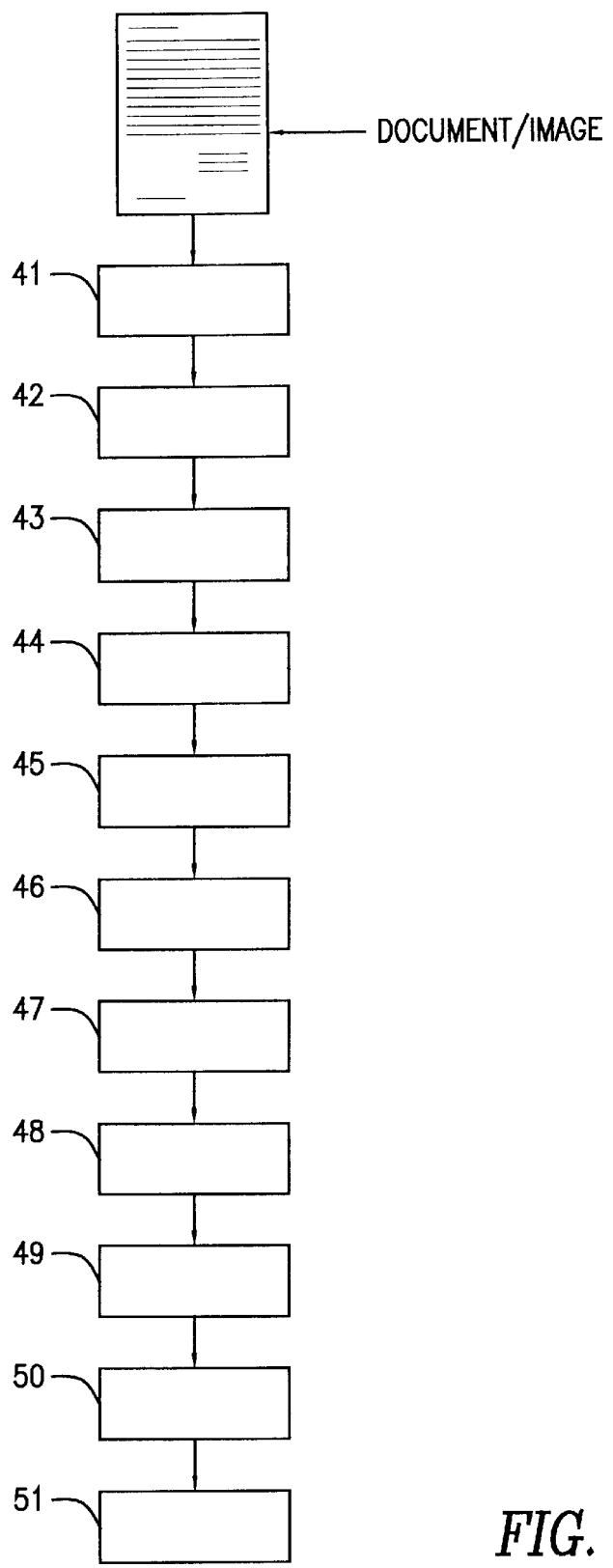
Referring to FIG. 2, there is shown a flow chart illustrating the process which is the object of this invention.
Figure 3:
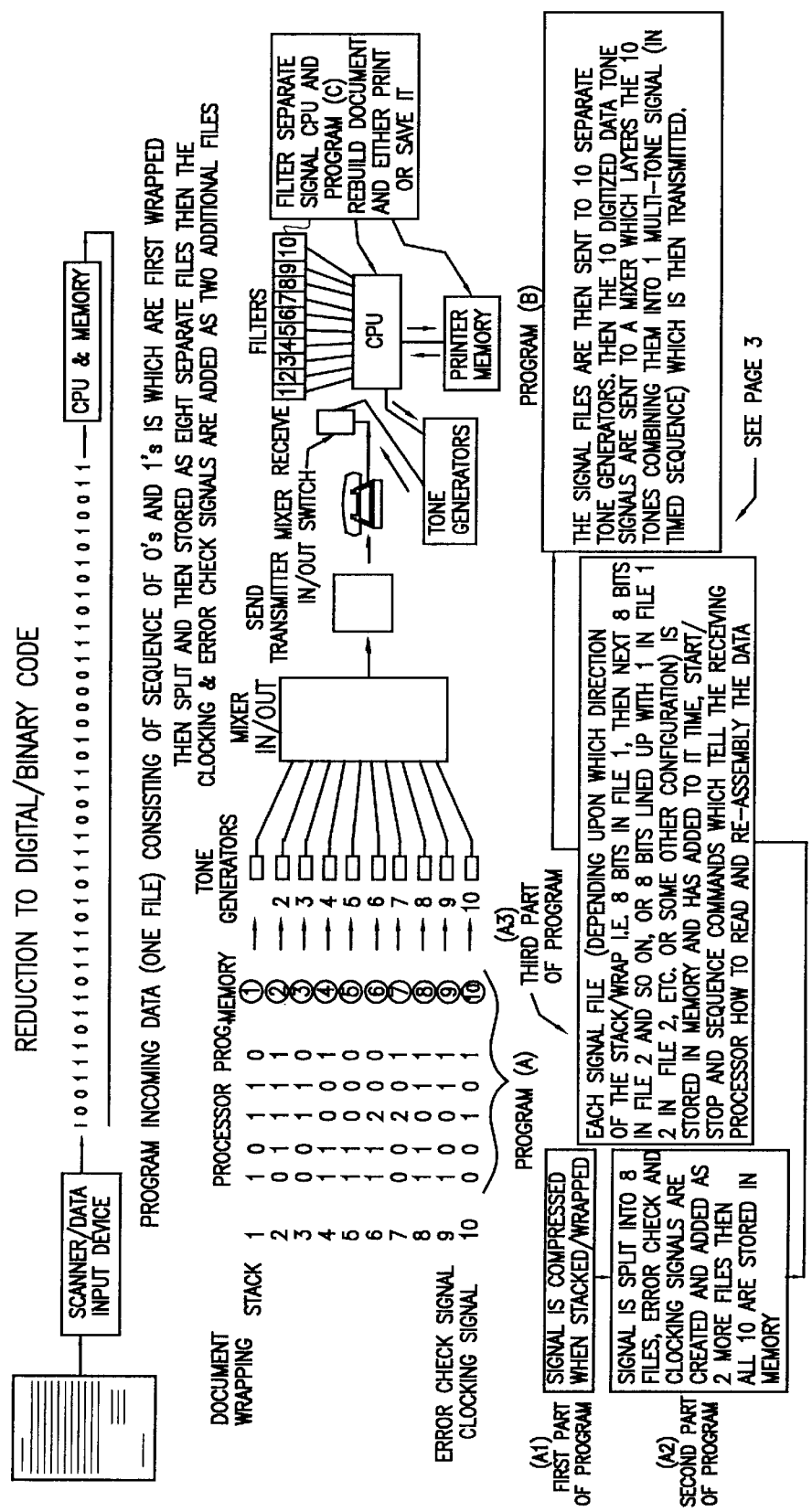
Referring to FIGS. 3 and 4, there is shown drawings depicting how the invention which is the subject of this application operates on bits of data.
Figure 4:
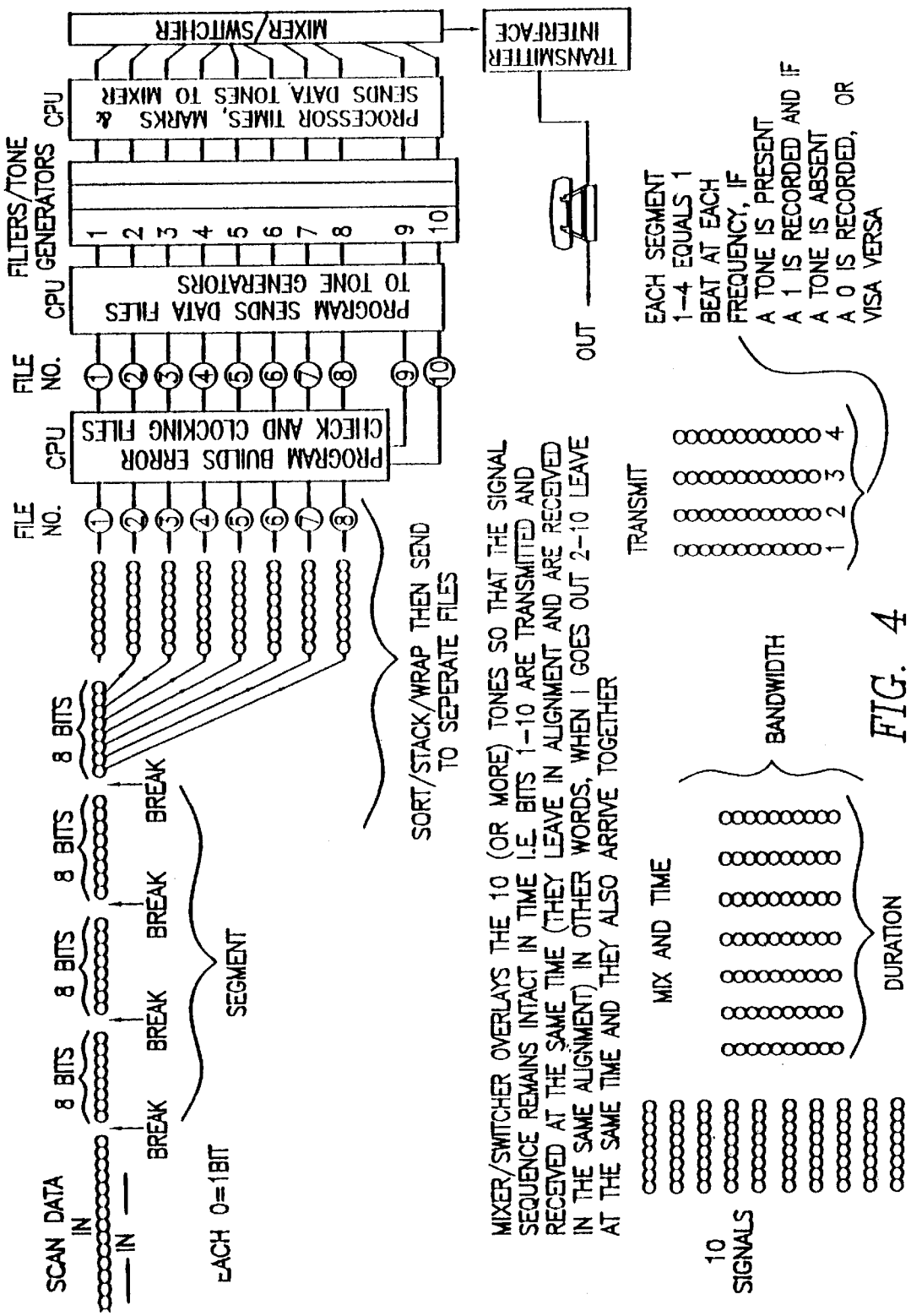

Referring to FIG. 2, there is shown a flow chart detailing the process by which data is transmitted according to the present invention. To transmit a document 40 using this invention, the document is first scanned at 41 and converted to a binary digital signal in the computer's CPU at 42. This stored data is compressed and then stacked/wrapped at step 43. At step 44 this stacked/wrapped signal is then processed so that: the first eight bits processed are stored in a first file, File 1; the next eight bits processed are stored in a second file, File 2; and so on. Alternatively, the data can be processed so that: the first bit of the first byte is stored in a first file, File 1, and the second bit of the first byte is stored in a second file, File 2; and so on such that the first bit of the second byte would then be stored in File 1 and the second bit of the second byte would be stored in File 2 and so on. At step 44 the stacked/wrapped signal is split into eight files with each file being comprised of eight bits. Error check and clocking signals are then created and added as two more files. All ten files are stored in the computer's memory. At step 45 each signal file has added to it a timed start/stop and sequence command to instruct the receiving processor how to read and reassemble the data. Alternatively, the timed start/stop and sequence command can be added to less than all of the signal files. The operation of steps 43, 44 and 45 on a single bit of data is shown in FIG. 3.

At step 46 the ten different signal files are sent to ten separate tone generators, which generators create tones separated from one another by the same frequency band width. For example, these ten tones over which the data in the ten files in question are to be transmitted could occur could begin at 500 Hertz, with each successive frequency being separated by 750 Hertz. This designation of frequencies can be implemented using existing telephone wiring and hardware and will allow for a minimum of 250 Hertz safe zone of separation with generated beat frequencies. Alternatively, the generated tones can be separated from one another by varying, predetermined frequency bandwidths. Moreover, instead of being sent to ten different tone generators, the ten signal files in question can be sent to one tone generator capable of generating multiple tones of varying frequency for each one of said ten signal files.

At step 47 the signals from the ten tone generators a combined by the mixer into one multi-tone signal in timed sequence. The mixer overlays the ten tones so that the signal sequence remains intact in time, i.e. bits 1 through 10 are transmitted and received at the same time, i.e. they leave in alignment and are received in the same alignment. Specifically, when the first bit of File 1 is transmitted, the first bit of Files 2 through 10 are also simultaneously transmitted. Each bit of the 10 tones equals one beat in time.

At step 48 the multi-tone signal is transmitted over a communications line. At step 49 the signal is received. At step 50 the signal is filtered and then sent to the CPU. At step 51 the signal is reassembled. From there signal can either be stored in memory or sent to a printer or other output device.

Using the aforementioned frequency designations, the following frequencies would be used to transmitted data according to the present invention: 500, 1250, 2000, 2700, 3500, 4250, 5000, 6750, 6500 and 7250 Hertz. Beat frequencies (subtractive) generated would be at 750, 1500, 2250, 3000, 3750, 4500, 5250, 6000 and 6750 Hertz. Beat frequencies (additive) generated would be at 1750, 2500, 3250, 4000, 4750, 5500, 6250 and 7000 Hertz. In the foregoing embodiment, additional harmonics would not be closer than 250 Hertz to main frequency. In addition, all frequencies generated above 7500 Hertz would be filtered out as they would not be used. The foregoing frequencies are representative only. It is, of course, understood that as filter technology improves, the bandwidths which can be filtered will narrow so that less separation between usable frequencies is required, thereby providing more frequencies on which to transmit data.

By using a selected code, the present invention can be used to encrypt the data being transmitted. This can be accomplished by setting the tone to bit numbering scheme differently for each data transmission sequence even to the point of employing a floating encryption based upon a pre-determined algorithm. This would permit data to be securely transmitted without fear that the person receiving the transmission is not the intended recipient as may happen when a wrong telephone number is dialed. Only the intended recipient would have the encryption key required to read and print the document.

An illustrative example of how data would be transmitted employing the present invention over the aforementioned frequency designations is provided below. Transmission of the word "TEST" using straight corresponding bit-dash tone code would occur as follows:

Beginning code (handshake) sent prior to actual document.

T=84=01010100=6500+5000+3500+a parity type check tone+timing.

E=69=01000101=6500+5750+7250+a parity type check tone+timing.

S=83=01010011=6500+5000+6500+a parity type check tone+timing.

T=84=01010100=6500+5000+3500+a parity type check tone+timing.

End of transmission sequence.

In the foregoing example, all four letters would be sent at the same time on four parallel frequencies and would be re-assembled after reception based on the parity check and timing key sent along with the data.

It will be understood that the embodiment described herein is merely exemplary that a person skilled in the art may make many variations and modifications to the described embodiments utilizing functionally equivalent elements to those described. Any variations or modifications to the invention just described are intended to be included within the scope of this invention as defined by the appended claims.

We claim:

1. A method for simultaneously transmitting multiple data files at multiple frequencies over a communications line at high speed, comprising the steps of:

compressing data to be transmitted;

splitting said data into multiple files;

generating and adding an error check signal to said multiple data files as a first additional file;

generating and adding a clocking signal to said multiple data files as a second additional file;

sending each one of said multiple data, said first additional and said second additional files to a separate tone generator;

generating a different tone for each one of said multiple data said first additional and said second additional files, wherein the frequency of each one of said tones are separated from one another by a specified frequency bandwidth;

combining said multiple tones into one multi-tone signal; and transmitting said multi-tone signal over a communications line.

2. The method according to claim 1, wherein said multiple data files are created from bytes of data to be transmitted, each one of said bytes being comprised of eight bits of data, each one of said bits corresponding to a particular position within each one of said bytes, and each one of said data files being comprised of bits from each one of said bytes corresponding to the same particular position.

3. The method according to claim 1, wherein said multiple data files are created from bytes of data to be transmitted, wherein each one of said multiple data files is comprised of a separate one of said bytes.

4. The method according to claim 1, wherein a timed start/stop and sequence command is added to said multiple data files, said first additional file and said second additional file.

5. The method according to claim 1, wherein each one of said files comprising said multi-tone signal is comprised of a plurality of bits of data, each one of said bits corresponding to a particular position in said files, and each bit corresponding to the same particular position in each one of said data files being transmitted simultaneously.

6. The method according to claim 5, wherein the bits of data corresponding to a first position in each one of said files are transmitted first, and the bits of data corresponding to a last position in each one of said data files are transmitted last.

7. The method according to claim 1, wherein said method is used to transmit data via a facsimile machine.

8. The method according to claim 1, wherein said method is used to transmit data via a video phone.

9. The method according to claim 1, wherein each one of said generated tones are separated from one another by predetermined frequency bandwidths.

10. The method according to claim 1, wherein said multiple data files are created from bytes of data to be transmitted, each one of said bytes being comprised of eight bits of data, each one of said bits corresponding to a particular position within each one of said bytes, and each one of said data files being comprised of bits from each one of said bytes corresponding to the same particular position.

11. The method according to claim 1, wherein said multiple data files are created from bytes of data to be transmitted, wherein each one of said multiple data files is comprised of a separate one of said bytes.

12. The method according to claim 1, wherein a timed start/stop and sequence command is added to said multiple data files, said first additional file and said second additional file.

13. The method according to claim 1, wherein each one of said files comprising said multi-tone signal is comprised of a plurality of bits of data, each one of said bits corresponding to a particular position in said files, and each bit corresponding to the same particular position in each one of said data files being transmitted simultaneously.

14. The method according to claim 1, wherein said method is used to transmit data via a facsimile machine.

15. The method according to claim 1, wherein said method is used to transmit data via a computer.

16. The method according to claim 1, wherein said method is used to transmit data via a computer.

17. A method for transmitting and receiving multiple data files simultaneously transmitted at multiple frequencies over a communications line at high speed, comprising the steps of:

storing data to be transmitted in a first computer memory;

compressing said stored data;

splitting said data into multiple files, wherein said multiple data files are created from bytes of data to be transmitted, each one of said bytes being comprised of eight bits of data, each one of said bits corresponding to a particular position within each one of said bytes, and each one of said data files being comprised of bits from each one of said bytes corresponding to the same particular position;

generating and adding an error check signal to said multiple data files as a first additional file;

generating and adding a clocking signal file to said multiple data files as a second additional file;

generating and adding a timed start/stop and sequence command to at least one of said multiple data files, said first additional file and said second additional file;

sending each one of said multiple data files, said first additional file and said second additional file to at least one tone generator;

generating a different tone for each one of said multiple data files, said first additional file and said second additional file, wherein the frequency of each one of said tones generated are separated from one another by predetermined frequency bandwidths;

combining said multiple tones into one multi-tone signal;

transmitting said multi-tone signal over a communications line, wherein each one of said files comprising said multi-tone signal is comprised of a plurality of bits of data, each one of said bits corresponding to a particular position in said data file, and each bit corresponding to the same particular position in each one of said files being transmitted simultaneously;

receiving said multi-tone signal;

filtering said signal;

reassembling said received signal; and storing said reassembled signal in a second computer memory.

18. The method according to claim 17, wherein said method is used to transmit data via a facsimile machine.

19. The method according to claim 17, wherein said method is used to transmit data via a video phone.

20. The method according to claim 17, wherein said method is used to transmit data via a computer.

* * * * *

UNITED STATES PATENT AND TRADEMARK OFFICE

Certificate

Patent No. 5,960,067

Patented: September 28, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: William K. Riceman, Greenville, SC (US); Stephen A. Hollock, Otego, NY (US); and Robert G. Riceman, Oneonta, NY (US).

Signed and Sealed this Twenty-Second Day of July 2008.

CURTIS KUNTZ
*Supervisory Patent Examiner*
Art Unit 2614